(12) United States Patent
Sato et al.

(10) Patent No.: US 8,559,938 B2
(45) Date of Patent: Oct. 15, 2013

(54) BASE STATION, MOBILE STATION, AND LINK ESTABLISHING METHOD

(75) Inventors: Tomonori Sato, Kawasaki (JP);
Masafumi Tsutsui, Kawasaki (JP);
Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/192,765

(22) Filed: Jul. 28, 2011

(65) Prior Publication Data

US 2011/0281576 A1 Nov. 17, 2011

Related U.S. Application Data

(63) Continuation of application No. PCT/JP2009/051714, filed on Feb. 2, 2009.

(51) Int. Cl.
*H04W 4/00* (2009.01)
(52) U.S. Cl.
USPC ........ 455/422.1; 455/434; 455/561; 370/336; 370/329

(58) Field of Classification Search
None
See application file for complete search history.

(56) References Cited

U.S. PATENT DOCUMENTS

| 2003/0114113 | A1 | 6/2003 | Kornprobst | |
|---|---|---|---|---|
| 2003/0236074 | A1* | 12/2003 | Ishii et al. | 455/69 |
| 2004/0228350 | A1* | 11/2004 | Kuroda et al. | 370/395.4 |
| 2005/0068979 | A1* | 3/2005 | Boer et al. | 370/445 |
| 2008/0299963 | A1* | 12/2008 | Balachandran et al. | 455/422.1 |
| 2009/0016266 | A1* | 1/2009 | Kim et al. | 370/328 |
| 2009/0092089 | A1* | 4/2009 | Okada | 370/329 |
| 2009/0201891 | A1* | 8/2009 | Lee et al. | 370/336 |
| 2010/0220698 | A1* | 9/2010 | Miyamoto | 370/338 |
| 2011/0165874 | A1* | 7/2011 | Amirijoo et al. | 455/434 |

FOREIGN PATENT DOCUMENTS

| JP | PCT/JP2006/324057 | * | 7/2006 |
|---|---|---|---|
| JP | 2007-134946 | | 5/2007 |
| JP | 2008-017195 | | 1/2008 |
| JP | 2008-148362 | | 6/2008 |

OTHER PUBLICATIONS

International Search Report issued for corresponding International Patent Application No. PCT/JP2009/051714, mailed Mar. 3, 2009.
Samsung; "Collision probability on RACH"; Agenda Item 5.9; 3GPP TSG-RAN 3 Meeting #56bis, Sorrento, Italy, Jan. 15-19, 2007; R2-070206; [Ref.: ISR mailed 3.3.09].
LG Electronics; "Initial access procedure"; Agenda Item: 7; 3GPP TSG RAN WG2# Ad Hoc on LTE; Cannes, France, Jun. 27-30, 2006; R2-061985; [Ref.: ISR mailed 3.3.09].

* cited by examiner

*Primary Examiner* — Rafael Pérez-Gutiérrez
*Assistant Examiner* — Keith Fang
(74) *Attorney, Agent, or Firm* — Myers Wolin, LLC

(57) ABSTRACT

A link establishing method to be implemented in a radio communication system sends a notifying signal notifying a plurality of radio resources from a base station when the base station judges that a collision of requests from a plurality of mobile stations has occurred, depending on a call request signal or a first connection request signal, and sends a second connection request signal from the mobile station using one radio resource selected from the plurality of radio resources notified by the notifying signal.

21 Claims, 16 Drawing Sheets

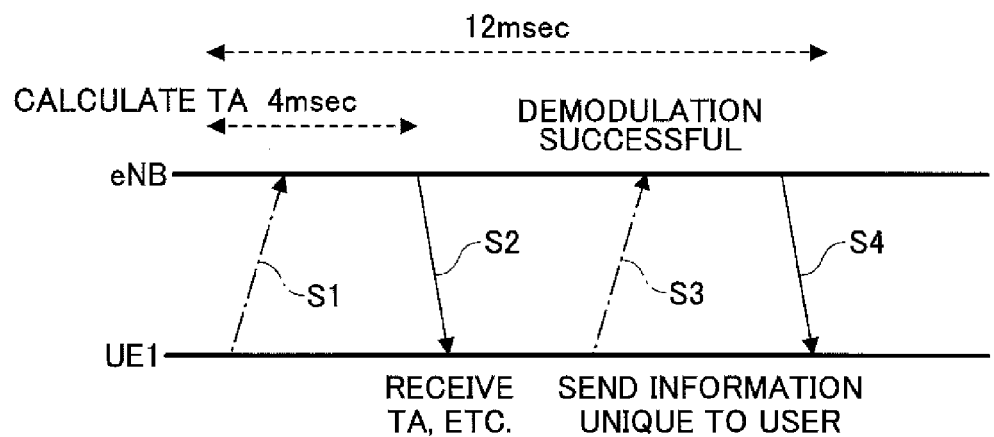

FIG.5

| Preamble No. | TA1 | UL_grant1 | C-RNTI1 | TA2 | UL_grant2 | C-RNTI2 |

BASE STATION, MOBILE STATION, AND LINK ESTABLISHING METHOD

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP/2009/051714 filed on Feb. 2, 2009, in the Japanese Patent Office, the disclosure of which is hereby incorporated by reference.

FIELD

The present invention relates to a base station, a mobile station, and a link establishing method.

BACKGROUND

During an initial access, a reconnection, or a handover in which a mobile station (hereinafter also referred to as a UE) starts a communication with a base station (hereinafter also referred to as an eNB), the mobile station (UE) performs a negotiation by sending a call request signal to the base station (eNB). This process will now be described by taking LTE (Long Term Evolution) as an example, which is one of the next-generation mobile phone standards that are being standardized.

FIG. 1 is a diagram illustrating an example of an initial access sequence of the LTE. In FIG. 1, when a UE 1 makes an initial access, a preamble number is selected, and a call request Messsage1 is sent to an eNB (step S1). The eNB detects the power of the Message1, detects a timing error of the eNB from a reference timing, and sends a call request response and an uplink communication enable signal, as Message2, to the UE 1 (step S2). The call request response includes a timing control signal (TA: Time Advance) that controls a transmission timing of the UE 1 so that the signal from the UE 1 is received by the eNB at the reference timing.

FIG. 2 is a diagram illustrating an example of a data format of the Message2. The Message2 includes a preamble number (Preamble No.) selected by the UE 1, the timing control signal (TA: Time Advance), information UL_grant granting allocation of an uplink radio resource to be used by the UE 1, and a user ID C-RNTI (Cell Radio Network Temporary Identifier) allocated for each cell. In the case of the LTE, the band (RB number) used by the UE 1, the data number (TBS), the modulation type, and the like are notified by the information UL_grant. One radio resource (Time Advance, UL_grant, and C-RNTI) is allocated from the eNB to the UE 1 by the Message2.

Returning now to the description of FIG. 1, when the UE 1 receives the Message2, the UE 1 judges whether the Message2 is addressed thereto based on the preamble number thereof. If the Message2 is addressed to the UE 1, the UE 1 shifts the transmission timing, and sends to the eNB a connection (RRC) request Message3 that includes information unique to the UE 1, using a notified radio resource (step S3). The eNB demodulates the received Message3, and if an error detection using a CRC (Cyclic Redundancy Check) succeeds, the eNB sends a connection response Message4 to the UE 1 (step S4). The negotiation is completed when the UE 1 receives the Message4.

In the case illustrated in FIG. 1, if a round-trip time is 4 msec, for example, the negotiation time required for the negotiation to be completed is approximately 12 msec.

Methods of reducing the negotiation time of a link establishing negotiation between the eNB and the UE are proposed in Japanese Laid-Open Patent Publications No. 2007-134946 and No. 2008-148362, for example.

When a plurality of UEs send the call request Message1 having the same preamble number, the negotiation time becomes relatively long. Particularly in the case of the LTE, only 64 Preamble Nos. exist, and the possibility of the plurality of UEs making the transmission using the same preamble number is relatively high.

FIG. 3 is a diagram for explaining a case in which UEs 1 and 2 send the call request Message1 having the same preamble number. In FIG. 3, when the UEs 1 and 2 send the Message1 having the same preamble number (step S11), the call requests Message1 from the UEs 1 and 2 appear as multipath signals to the eNB. The eNB detects each power of the Message1, calculates the Time Advance from the Message1, and sends a call request response and an uplink communication enable signal, as Message2, to the UEs 1 and 2 (step S12).

Each of the UEs 1 and 2 sends a connection (RRC) request Message3, including the information unique to the UE, to the eNB based on the information of the Message2 that is received (step S13). The eNB demodulates each of the Message3 that is received, but the demodulation will be unsuccessful because the information unique to the UE 1 and the information unique to the UE 2 differ. For this reason, the eNB does not send a connection response Message4 (step S14). FIG. 3 illustrates each signal that is not sent by dotted arrows.

When the UEs 1 and 2 do not receive the Message4, the UEs 1 and 2 resends the Message3 a preset number of times, which may be 4 times, for example (steps S15 and S17).

However, because the UEs 1 and 2 sends the Message3 using the same radio resource, the eNB is unable to demodulate the Message3, and thus, the eNB does not send the Message4 (steps S16 and S18).

Because the UEs 1 and 2 after resending the Message3 the preset number of times are unable to receive the Message4, the UEs 1 and 2 detect a collision, and send the Message1 in order to start the negotiation again (step S19). For this reason, a minimum negotiation time is 56 msec (=44 msec+12 msec) for the above example, and there was a problem in that a relatively long negotiation time is required.

SUMMARY

One aspect of the present invention is to provide a base station, a mobile station, and a link establishing method, which may reduce the negotiation time.

According to one aspect of the present invention, there is provided a base station including a transmitter/receiver configured to perform a radio communication with a mobile station; and a signal processor configured to send a notifying signal notifying a plurality of radio resources when a collision of requests from a plurality of mobile stations is judged depending on call request signal or a first connection request signal.

According to another aspect of the present invention, there is provided a mobile station including a transmitter/receiver configured to perform a radio communication with a base station; and signal processor configured to send a second connection request signal using one radio resource selected from a plurality of radio resources notified by a notifying signal received from the base station depending on a call request signal or a first connection request signal.

According to still another aspect of the present invention, there is provided a link establishing method to be implemented in a radio communication system, including sending a notifying signal notifying a plurality of radio resources from a base station when the base station judges that a collision of requests from a plurality of mobile stations has occurred, depending on a call request signal or a first connection request signal; and sending a second connection request signal from the mobile station using one radio resource selected from the plurality of radio resources notified by the notifying signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating an example of an initial access sequence of the LTE;

FIG. 2 is a diagram illustrating an example of a data format of Message2;

FIG. 5 is a diagram illustrating an example of a data format of Message2' including a plurality of radio resource allocation information;

DESCRIPTION OF EMBODIMENTS

A description will now be given of a base station, a mobile station, and a link establishing method in each embodiment according to the present invention.

Preferred embodiments of the present invention will be described with reference to the accompanying drawings by taking Long Term Evolution (LTE) as an example, which is one of the next-generation cellular communication standards that are being standardized. However, the disclosed base station, mobile station, and link establishing method are not limited to the LTE, and are similarly applicable to other wireless communication system, including Wideband Code Division Multiple Access (W-CDMA), CDMA2000, High Speed Packet Access (HSPA), HSPA Evolution, the fourth generation cellular communication standards (for example, IMT-Advanced), and more recent cellular communication standards that are being standardized.

First Embodiment

Figure 3:
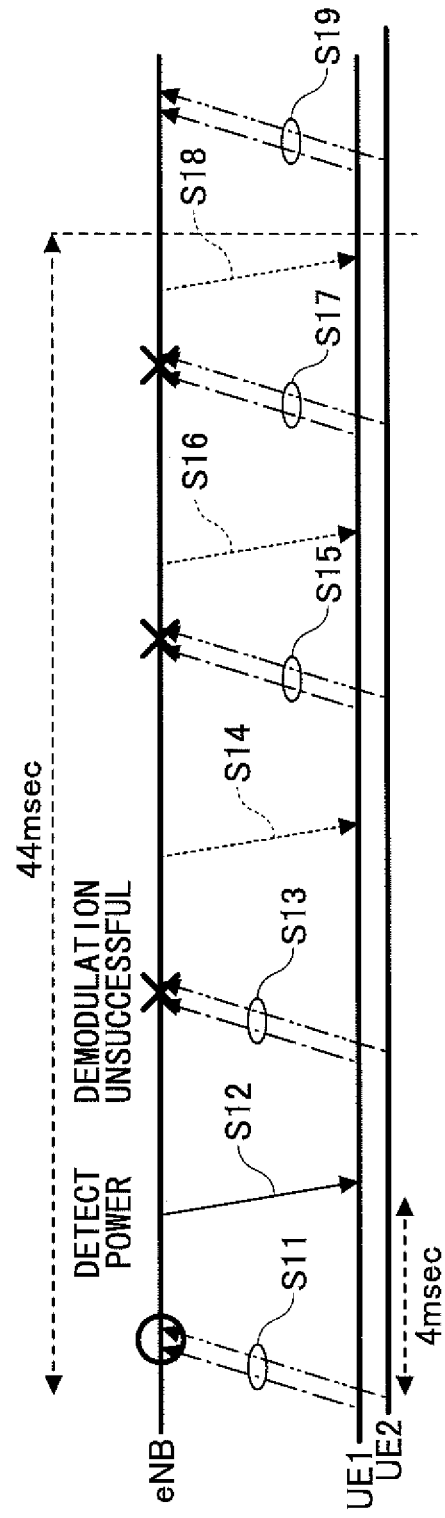
FIG. 3 is a diagram for explaining a case in which 2 UEs 1 and 2 sends the call request Message1 having the same preamble number.
Figure 4:
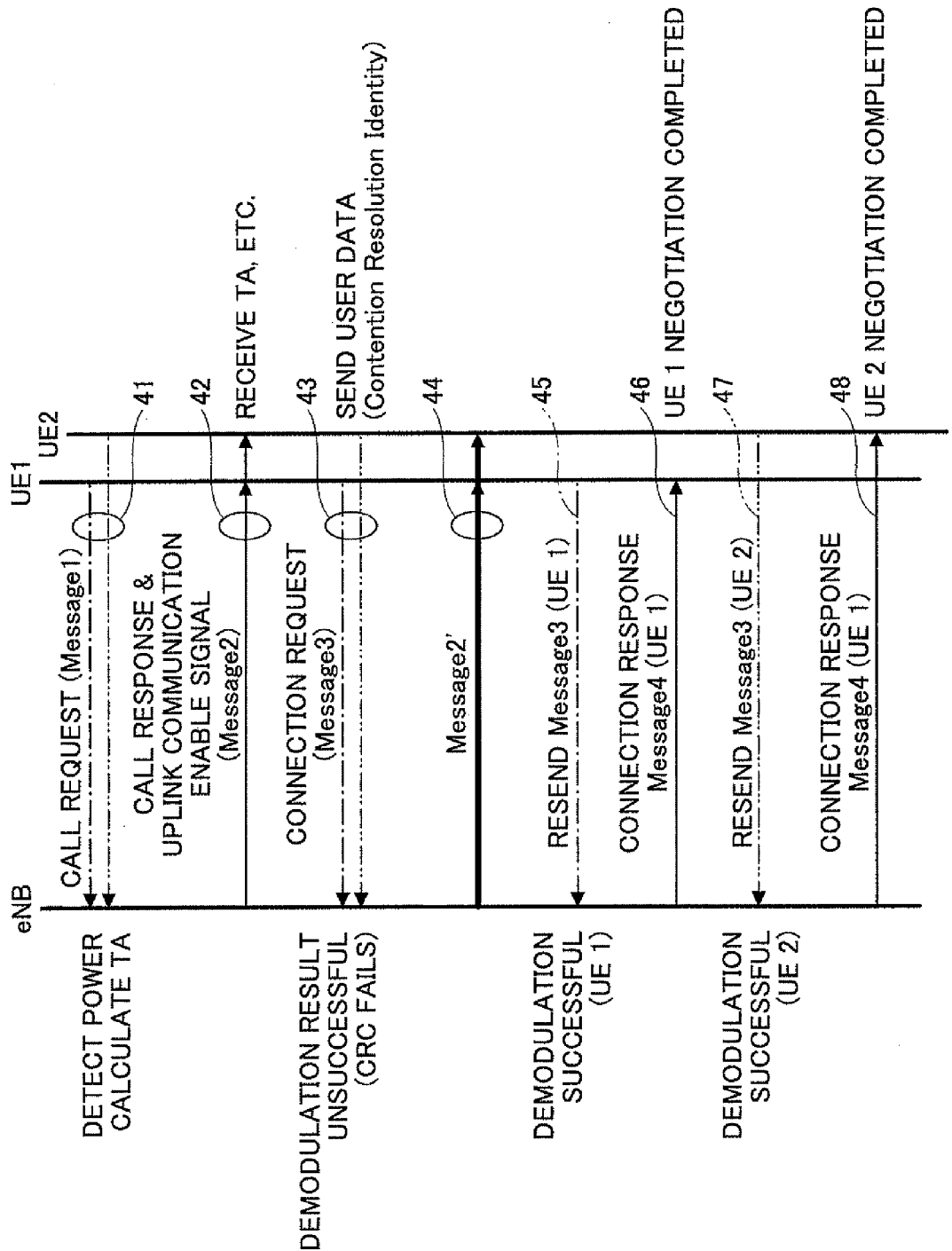
FIG. 4 is a diagram illustrating a link establishment between a base station and a mobile station in a first embodiment of the present invention.

FIG. 4 is a diagram illustrating a link establishment between a base station and a mobile station in a first embodiment of the present invention.

In FIG. 4, when 2 mobile stations (UEs) 1 and 2 send call requests Message1 having the same preamble number (step 41), the call requests Message1 from the UEs 1 and 2 appear as multipath signals to a base station (eNB). The eNB detects each power of the Message1, calculates the Time Advance (hereinafter also referred to as TA) from the 2 Message1, and sends a call request response and an uplink communication enable signal, as Message2, to the UEs 1 and 2 (step 42).

Each of the UEs 1 and 2 sends a connection (RRC) request Message3, including information unique to the UE, to the eNB based on the information of the Message2 that is received (step 43). The eNB demodulates the 2 Message3 that are received, and if the demodulation is unsuccessful, the eNB judges that there exist a plurality of UEs using the same preamble number, that is, detects a collision, by also referring to the result of the power detection. For example, the demodulation is unsuccessful if an error detected by an error detection using a CRC (Cyclic Redundancy Check) cannot be corrected and the CRC fails. For this reason, the eNB sends a call request response including a plurality of radio resource allocation information, and an uplink communication enable signal, as Message2', to the UEs 1 and 2 at a timing with which a connection request response would be sent (step 44).

When the UEs 1 and 2 receive the (notifying signal) Message2' at a timing with which a connection response Message4 would be received, each of the UEs 1 and 2 judge that there is at least one other UE using the same preamble number, and resends the Message3 (steps 45 and 47). In this state, each of the UEs 1 and 2 resends the Message3 including information unique to the UE, by selecting the plurality of transmission timings notified by the Message2' or, the radio resource allocation information or, both (steps 46 and 48).

The selection of the radio resource allocation information may be made by each UE using information such as (1) a reception level of the notifying signal (e.g., Signal to Interference Noise Ratio (SINR)), (2) a distance from the eNB, (3) a reliability of the TA information notified by the Message2, and (4) a random number.

As a result, because the UEs 1 and 2 resend the Message3 using different radio resources (steps 45 and 47), the eNB is able to demodulate the information unique to the UE, and the eNB may send a connection response Message4 with respect to the UEs 1 and 2 (steps 46 and 48).

The negotiation is completed in the above described manner.

FIG. 5 is a diagram illustrating an example of a data format of the Message2' including a plurality of radio resource allocation information. As illustrated in FIG. 5, the Message2' includes the preamble number selected by the UEs 1 and 2. The Message2' further includes, as a first radio resource, a timing signal TA1 of the UE 1, uplink radio resource allocation enable information UL_grant1 used by the UE 1 or the UE 2, and user ID Cell Radio Network Temporary Identifier (C-RNTI) allocated for each cell. In the case of the LTE, the band (e.g., Resource Block (RB) number), the data number (e.g., Transport Block Size (TBS)), the modulation type, and the like are notified by the UL_grant (UL_grant1 or UL_grant2). In addition, the Message2' also includes, as a second radio resource, a timing signal TA2 of the UE 2, uplink radio resource allocation enable information UL_grant2 used by the UE 2 or the UE 1, and user ID C-RNTI (Cell Radio Network Temporary Identifier) allocated for each cell. The eNB allocates the radio resources (Time Advance, UL_grant, and C-RNTI) to the UE 1 and the UE by the Message2'.

In this embodiment, 2 radio resources are allocated, however, in other embodiments, 3 or more radio resources may be allocated.

Next, a more detailed description will be given of the operations of the eNB and the UE.

Figure 6:
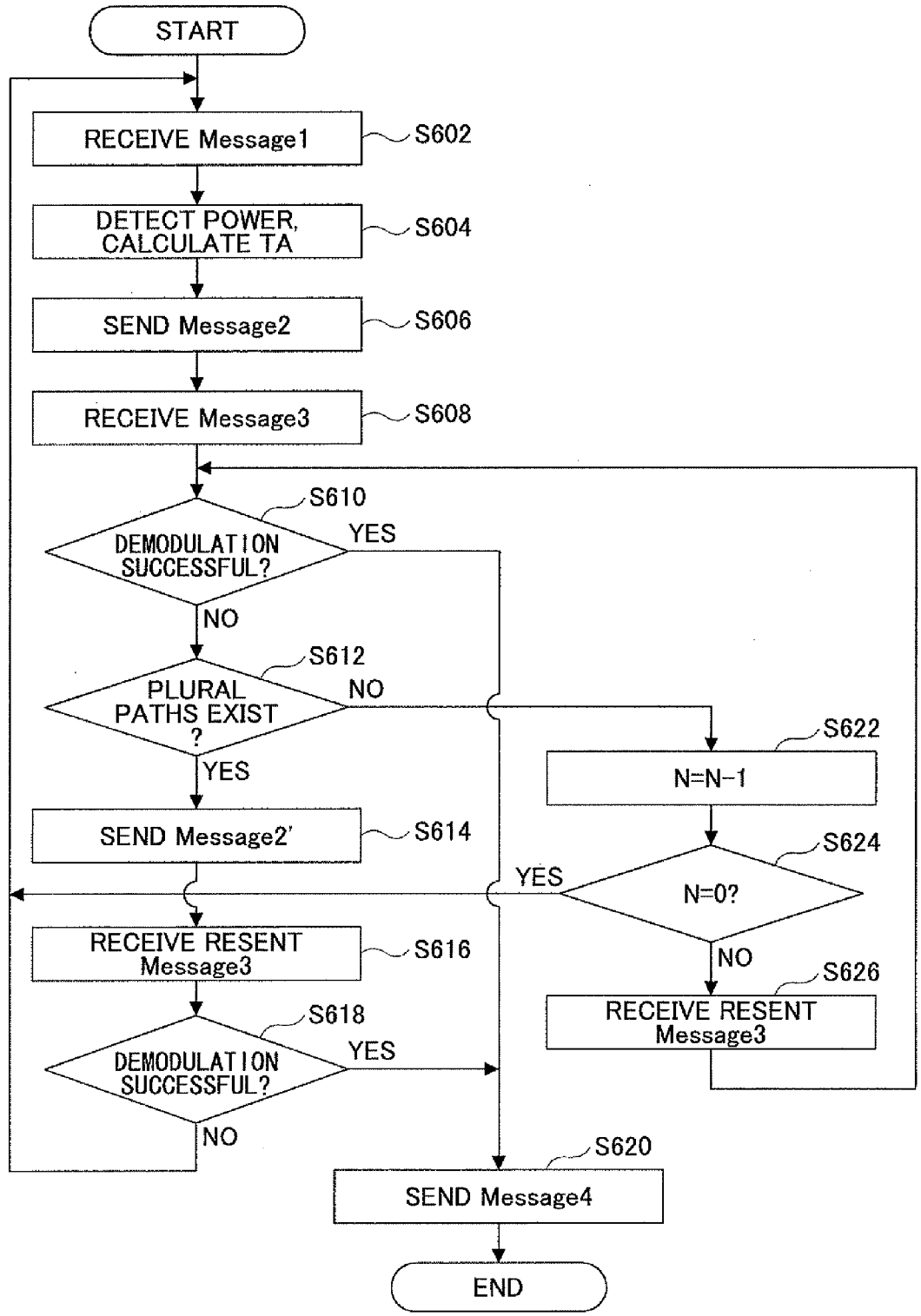
FIG. 6 is a flow chart for explaining an operation of the base station when making the link establishment in the first embodiment.

FIG. 6 is a flow chart for explaining an operation of the base station (eNB) when making the link establishment in the first embodiment. In FIG. 6, the eNB receives the call request Message1 from the UE (step S602). The eNB detects the power of the received call request Message1, and calculates the TA (step S604). The eNB sends the call request response and the uplink communication enable signal, as the Message2, to the UE (step S606). In addition, the eNB receives the connection (e.g., Radio Resource Control (RRC)) request Message3, including the information unique to the UE, from the UE based on the information of the Message2 (step S608).

The eNB demodulates the Message3, and judges whether the demodulation is performed in a state in which an error detected by the error detection using the CRC is corrected and the CRC is successful, for example (step S610). If the demodulation is performed without the error (YES in step S610), no collision is generated between the UE 1 and the UE 2, and the eNB sends the Message4 to the UE (step S620).

On the other hand, if the error is detected during the demodulation of the Message4 (NO in step S610), the eNB judges whether a plurality of paths exist (step S612).

Figure 7:
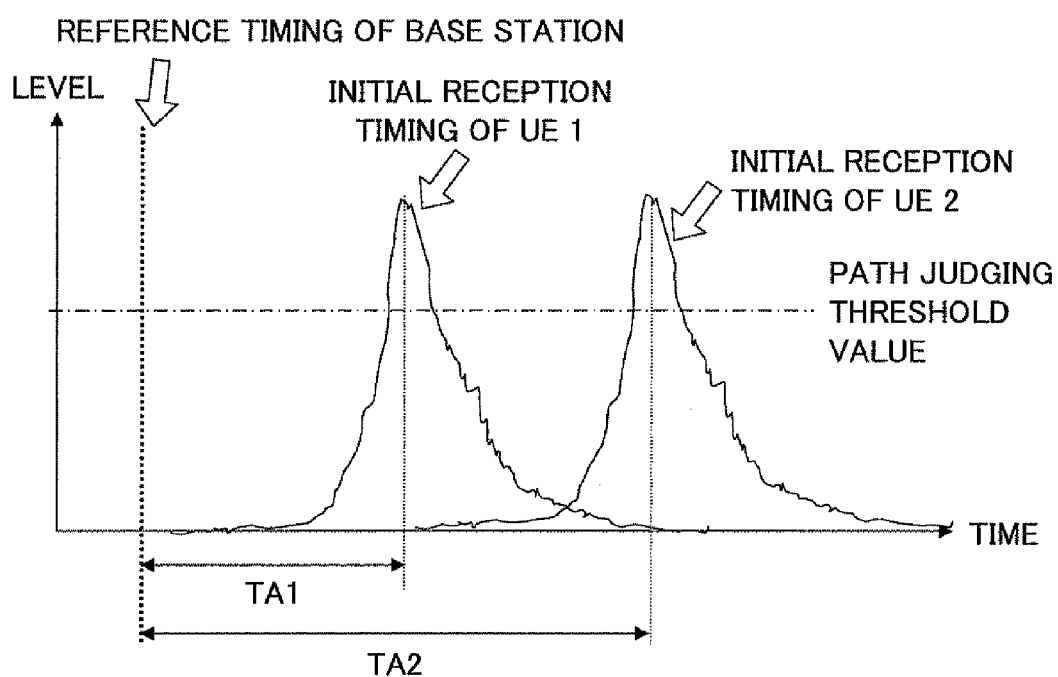
FIG. 7 is a diagram illustrating an example of a delay profile in a power detection.

FIG. 7 is a diagram illustrating an example of a delay profile in the power detection. The eNB uses the result of the power detection of the Message1 to calculate differences (TA1 and TA2) between a reference timing and timings of the paths having a power level greater than a path judging threshold value. The eNB also detects the number of paths having the power level greater than the path judging threshold value. In the example illustrated in FIG. 7, TA1<TA2.

Returning to the description of FIG. 6, if the demodulation is performed without the error (YES in step S610) and a plurality of paths are detected (YES in step S612), the eNB judges that there exist a plurality of UEs using the same preamble number, that is, detects a collision of the UEs. Hence, the eNB sends the Message2' including a plurality of radio resource allocation information corresponding to the number of detected paths, to the UEs 1 and 2 (step S614). More particularly, the eNB notifies the UEs 1 and 2 of the Message2', notifying the call request response including the plurality of radio resource allocation information, and the uplink communication enable signal, at a timing with which a connection request response would be sent.

The eNB receives the Message3 resent from the UE (step S616). Then, the eNB judges whether the demodulation of the received Message3 is performed in a state in which an error detected by the error detection using the CRC is corrected and the CRC is successful, for example (step S618). If the demodulation is performed without the error (YES in step S618), the eNB sends the Message4 to the UE (step S620). On the other hand, if the error is detected during the demodulation of the Message4 (NO in step S618), the eNB waits or assumes a standby state until the Message1 is received from the UE (step S602).

If the eNB does not detect a plurality of paths (NO in step S612), the eNB decrements a counted value of a retransmission counter N of the Message3, indicating the number of retransmissions by a counted value thereof, by 1 (step S622). The eNB judges whether the counted value of the retransmission counter N is 0 (step S624). If N=0 (YES in step S624), the eNB assumes the standby state until the Message1 is received from the UE (step S602). On the other hand, if N>0 (NO in step S624), the eNB receives the Message3 resent from the UE (step S626). Then, the eNB judges whether the demodulation of the received Message3, resent from the UE, is performed in a state in which an error detected by the error detection using the CRC is corrected and the CRC is successful, for example (step S610). The operation is performed thereafter in a manner similar to that described above.

Figure 8:
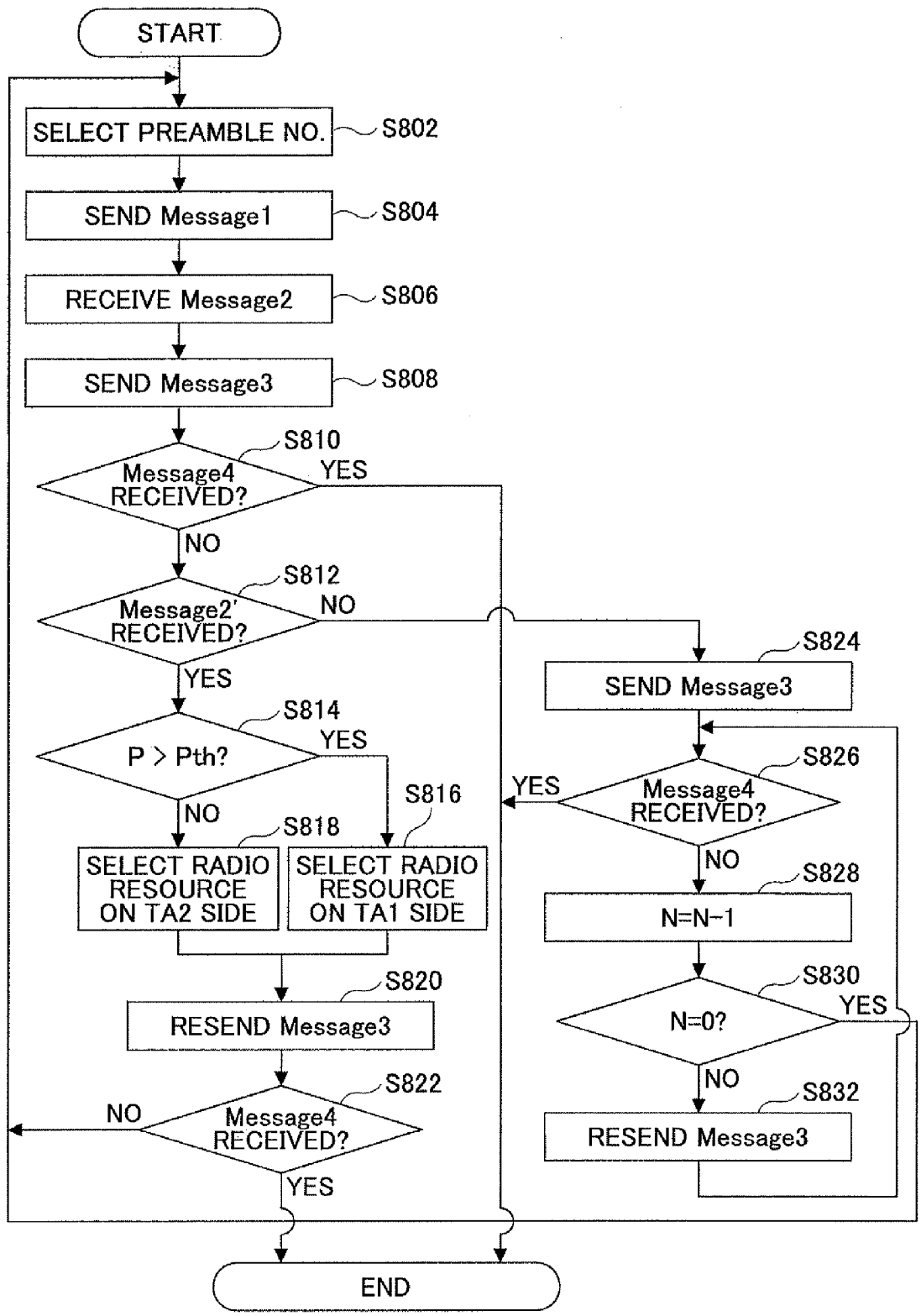
FIG. 8 is a flow chart for explaining an operation of the mobile station when making the link establishment in the first embodiment.

FIG. 8 is a flow chart for explaining an operation of the mobile station (UE) when making the link establishment in the first embodiment. In FIG. 8, the UE selects the preamble number (step S802), and sends the call request Message1 to the eNB (step S804). The UE receives the call request response and the uplink communication enable signal, as the Message2, from the eNB (step S806), and sends the connection (RRC) request Message3, including the information unique to the UE, to the eNB based on the information of the received Message2 (step S808).

Next, the UE judges whether the connection request response Message4 is received from the eNB (step S810). If the Message4 is received (YES in step S810), the negotiation is completed.

On the other hand, if the UE does not receive the connection request response Message4 from the eNB (NO in step S810), the UE judges whether the Message2', including the plurality of radio resource allocation information, is received from the eNB (step S812). For example, the UE selects the radio resource to be used by itself, from the plurality of radio resources that are notified by the plurality of radio resource allocation information, depending on the reception level of the Message2' (or notifying signal).

For example, the UE compares a reception level P (or an average value of P) of the notifying signal and a threshold value Pth of the notifying signal reception level and judges whether P>Pth (step S814). If P>Pth (YES in step S814), the UE judges that it is located at a position close to the eNB, and selects the radio resource allocation information on the TA1 side (step S816). On the other hand, if P>Pth does not stand (NO in step S814), the UE judges that it is located at a position distant from the eNB, and selects the radio resource allocation information on the TA2 side (step S818). The selection of the radio resource allocation information may be made using information such as the reliability of the TA information notified by the Message2, a random number, and the like.

In this embodiment, the radio resource allocation information notified by the Message2' is selected using the reception level of the notifying signal (or notifying information) notified to the UE. In other embodiments, the TA notified to the UE may be estimated in advance, in order to select the radio resource allocation information notified by the Message2' that is equal to the estimated TA or is approximately the same as the estimated TA.

The UE uses the selected radio resource allocation information to resend the Message3 (step S820). In addition, the UE judges whether the Message4 is received from the eNB (step S822). If the Message4 is received from the eNB (YES in step S822), the negotiation is completed.

On the other hand, if the Message4 from the eNB is not received (NO in step S822), the UE selects the preamble number again (step S802), in order to restart the negotiation with the eNB.

On the other hand, if the Message2' is not received (NO in step S812), the UE judges that the Message3 sent did not reach the eNB for some reason other than a collision with another UE, and resends the Message3 (step S824). The UE judges whether the Message4 is received (step S826), and if the Message4 is received (YES in step S826), the negotiation is completed.

If the Message4 is not received (NO in step S826), the UE decrements the counted value of the retransmission counter N of the Message3 by 1 (step S828). The UE judges whether N=0 (step S830). If N>0 (NO in step S830), the UE resends the Message3 (step S832), and judges whether the Message4 is received (step S826). On the other hand, if N=0 (YES in step S830), the UE selects the preamble number again (step S802), in order to restart the negotiation with the eNB.

Second Embodiment

In the first embodiment, the eNB detects the collision of a plurality of UEs based on the connection requests (Message3) from the UEs, and sends the notifying signal (Message2') including the plurality of radio resource allocation information.

On the other hand, in a second embodiment, the eNB detects the collision of a plurality of UEs based on the call requests (Message1) from the UEs, and sends the notifying signal (Message2') including the plurality of radio resource allocation information.

Figure 9:
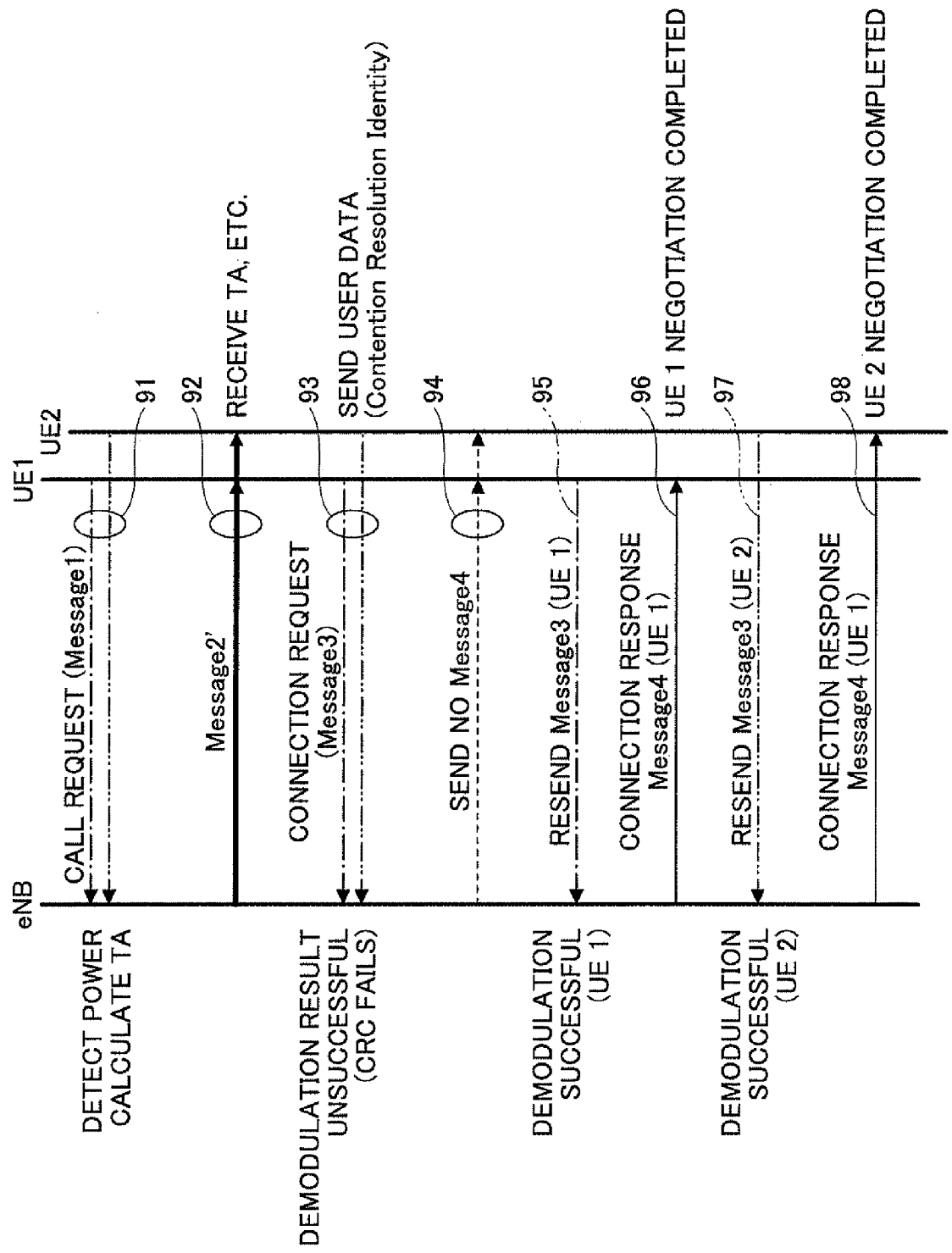
FIG. 9 is a diagram illustrating an example of a link establishment between the base station and the mobile station in a second embodiment of the present invention.

FIG. 9 is a diagram illustrating an example of a link establishment between the base station and the mobile station in the second embodiment of the present invention.

In FIG. 9, the 2 mobile stations (UEs) 1 and 2 select the same preamble number and send call requests Message1 having the same preamble number (step 91). The base station (eNB) detects a collision of the plurality of UEs from a result of detecting the power levels of the call requests Message1. For example, if there exist a plurality of paths having the power level greater than or equal to a threshold value, the eNB judges that a plurality of UEs are sending the call requests Message1 having the same preamble number, and notifies a call request response including a plurality of radio resource allocation information, and an uplink communication enable signal, as Message2', to the UEs 1 and 2 at a timing with which a connection request response and an uplink communication enable would be sent as Message2 (step 92).

When the UEs 1 and 2 receive the Message2', each of the UEs 1 and 2 sends the Message3 using a specific radio resource amongst the plurality of radio resources (step 93).

For example, the specific radio resource that is used is a first radio resource amongst the plurality of radio resources, for each of the UEs 1 and 2.

If the UEs 1 and 2 do not use the same preamble number, the eNB may demodulate the Message3 and send the Message4. But in this example, the eNB may not demodulate the Message3 because the UEs 1 and 2 send the Message3 including the information unique to the UE using the same radio resource. For this reason, the eNB does not send the Message4 as indicated by a dotted arrow (step 94).

When each of the UEs 1 and 2 does not receive the Message4, each of the UEs 1 and 2 judges that there is at least one other UE, other than itself, that is using the same preamble number. Hence, in this case, each of the UEs 1 and 2 resends the Message3 including information unique to the UE, by selecting the plurality of transmission timings notified by the Message2' or, the radio resource allocation information or, both (steps 95 and 97).

The selection of the radio resource allocation information may be made by each UE using information such as (1) a reception level of the notifying signal (SINR), (2) a reliability of the TA information notified by the Message2, (3) a distance from the eNB, and (4) a random number.

As a result, because the UEs 1 and 2 resend the Message3 using different radio resources (steps 95 and 97), the eNB is able to demodulate the information unique to the UE, and the eNB may send a connection response Message4 with respect to the UEs 1 and 2 (steps 96 and 98).

The negotiation is completed in the above described manner.

Next, a more detailed description will be given of the operations of the eNB and the UE.

Figure 10:
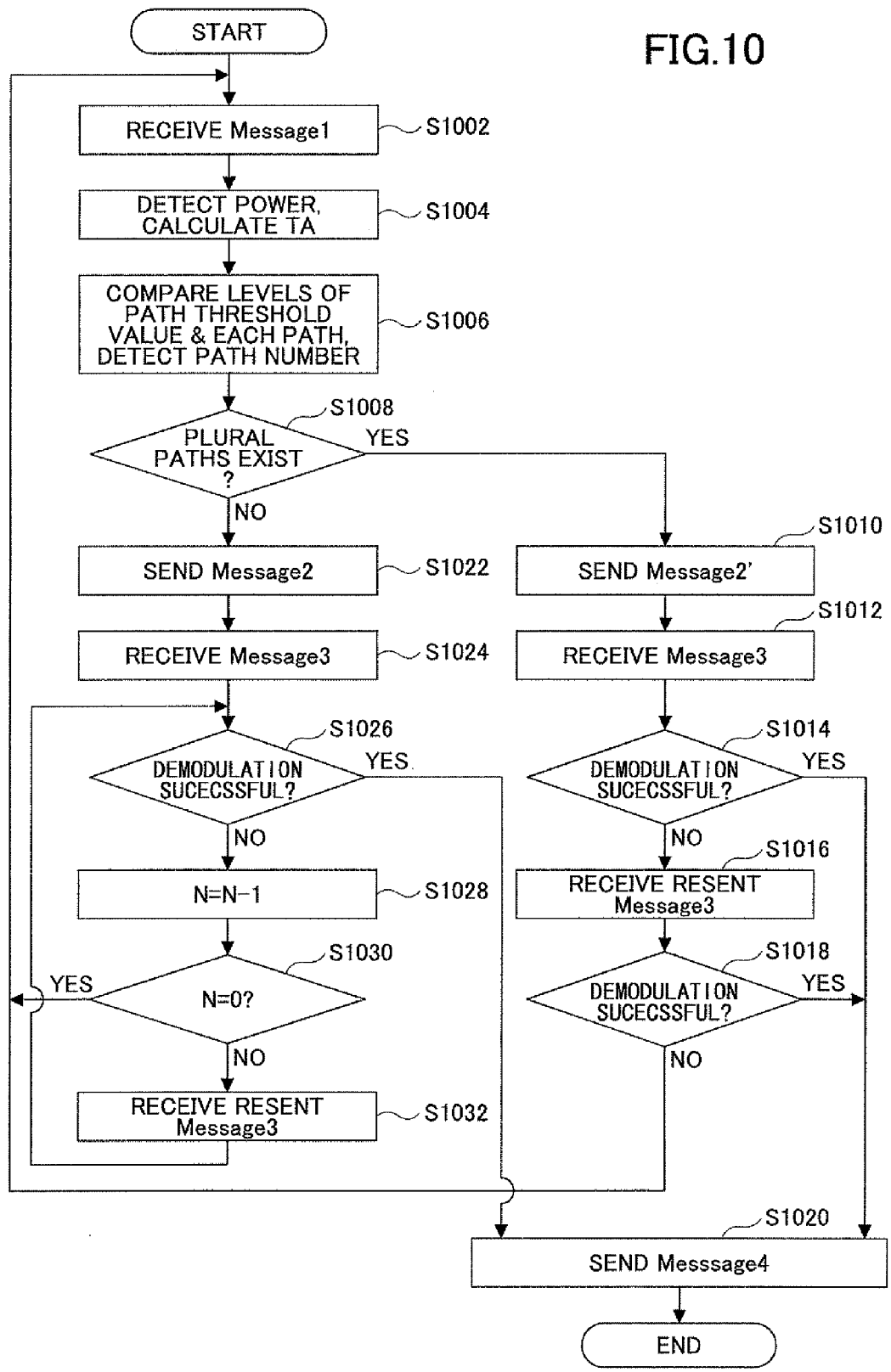
FIG. 10 is a flow chart for explaining an operation of the base station when making the link establishment in the second embodiment.

FIG. 10 is a flow chart for explaining an operation of the base station (eNB) when making the link establishment in the second embodiment. In FIG. 10, the eNB receives the call request Message1 from the UE (step S1002). The eNB detects the power of the received call request Message1, and calculates the TA (step S1004). The eNB compares the path judging threshold value and the power level of each path, and detects the number of paths having the power level greater than the path judging threshold value (step 1006). The number of paths having the power level greater than the path judging threshold value may be detected in the manner described above in conjunction with FIG. 7.

The eNB judges whether a plurality of paths exist (step S1008). If a plurality of paths exist (YES in step S1008), the eNB judges that there exist a plurality of UEs using the same preamble number (that is, detects a collision. Hence, the eNB sends the Message2' including the plurality of radio resource allocation information greater than or equal to the number of detected paths to the UEs 1 and 2 (step S1010). More particularly, the eNB sends the call request response including the plurality of radio resource information, and the uplink communication enable signal, as the Message2', to the UEs 1 and 2 with the timing at which the call request response is to be sent.

The eNB receives the Message3 resent from the UEs 1 and 2 (step S1012), and judges whether the received Message3 is successfully demodulated (step S1014). If the received Message3 is successfully demodulated (YES in step S1014), the eNB sends the Message4 to the UEs 1 and 2 (step S1020).

On the other hand, if the demodulation of the received Message3 is unsuccessful (NO in step S1014), the eNB receives the Message3 resent from the UEs 1 and 2 (step S1016). The eNB judges whether the received Message3 is successfully demodulated (step S1018). If the received Message3 is successfully demodulated (YES in step S1018), the eNB sends the Message4 to the UEs 1 and 2 (step 1020).

If the demodulation of the received Message3 is unsuccessful (NO in step S1018), the process returns to the start and waits or assumes a standby state until the Message1 is received from the UE (step S1002).

On the other hand if a plurality of detected paths do not exist (NO in step S1008), the eNB sends the Message2 to the UE (step S1022), and receives the Message3 from the UE as a response thereto (step S1024).

The eNB demodulates the received Message3, and judges whether the received Message3 is successfully demodulated (step S1026). If the received Message3 is successfully demodulated (YES in step S1026), the eNB sends the Message4 to the UEs 1 and 2 (step 1020).

On the other hand, if the demodulation of the received Message3 is unsuccessful (NO in step S1026), the eNB decrements the counted value of the retransmission counter N of the Message3 by 1 (step S1028). The eNB judges whether the counted value of the retransmission counter N is 0 (step S1030). If N=0 (YES in step S1030), the eNB assumes the standby state until the Message1 is received from the UE (step S1002). On the other hand, if N>0 (NO in step S1030), the eNB receives the Message3 resent from the UE (step S1032). Then, the eNB judges whether the received Message3, resent from the UE, is successfully demodulated (step S1026). The operation is performed thereafter in a manner similar to that described above.

Figure 11:
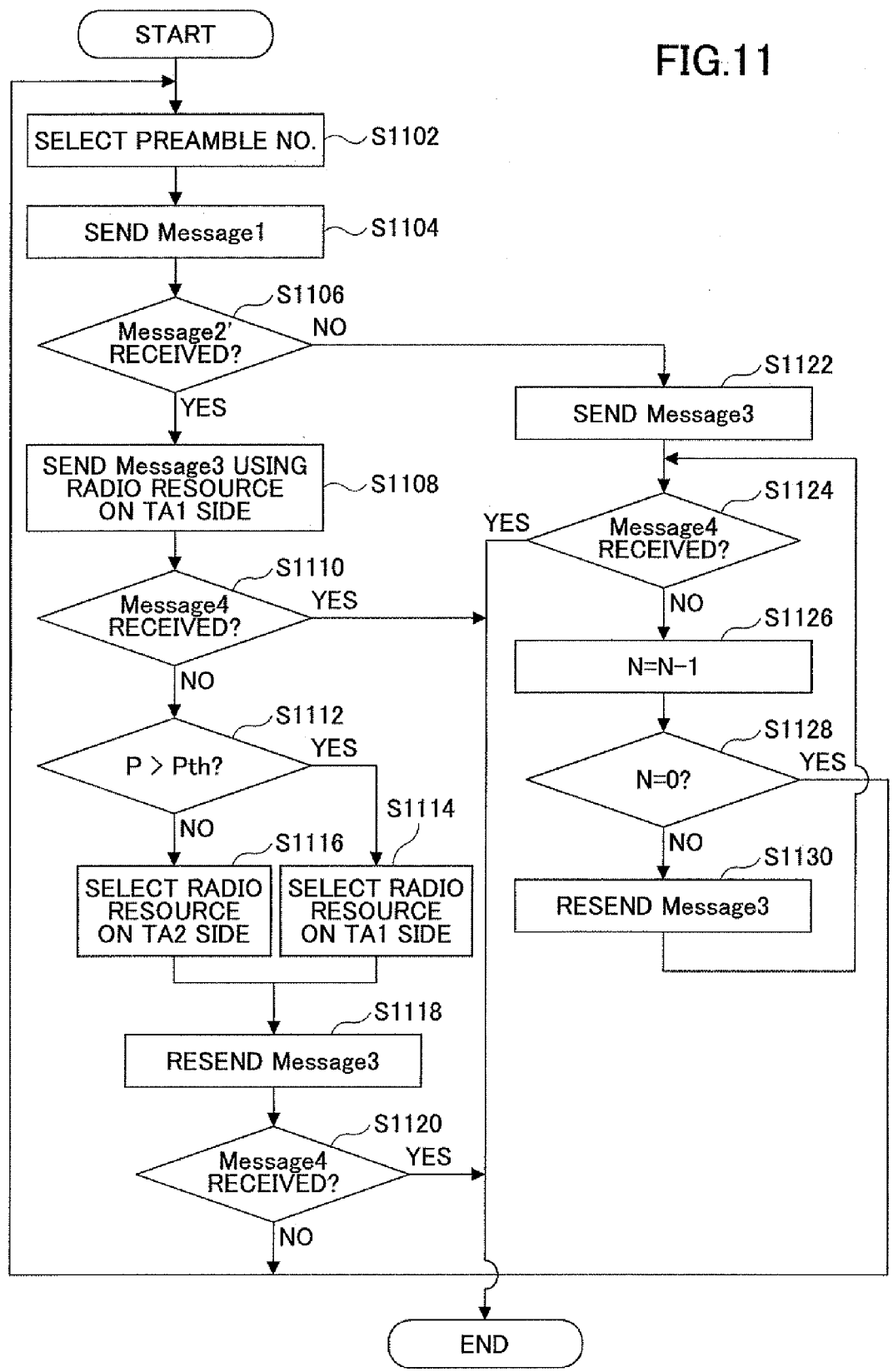
FIG. 11 is a flow chart for explaining an operation of the mobile station when making the link establishment in the second embodiment.

FIG. 11 is a flow chart for explaining an operation of the mobile station (UE) when making the link establishment in the second embodiment. In FIG. 11, the UE selects the preamble number (step S1102), and sends the call request Message1 to the eNB (step S1104).

Next, the UE judges whether the call request response including the plurality of radio resources, and the uplink communication enable signal, that is, the Message2', is received from the eNB (step S1106). If the Message2' is received from the eNB (YES in step S1106), the UE sends the connection (RRC) request Message3, including the information unique to the UE, to the eNB (step 1108). The UE judges whether the Message4 is received from the eNB (step S1110), and if the Message4 is received (YES in step S1110), the negotiation is completed.

On the other hand, if the UE does not receive the Message4 from the eNB (NO in step S1110), the UE detects a reception level P of the Message2' (or notifying signal), and selects the radio resource to be used by the UE from the plurality of radio resources that are notified. The UE compares the reception level P (or an average value of P) of the Message2' (or notifying signal) and a threshold value Pth of the notifying signal reception level and judges whether P>Pth (step S1112). If P>Pth (YES in step S1112), the UE judges that it is located at a position close to the eNB, and selects the radio resource allocation information on the TA1 side (step S1114). On the other hand, if P>Pth does not stand (NO in step S1112), the UE judges that it is located at a position distant from the eNB, and selects the radio resource allocation information on the TA2 side (step S1116). The selection of the radio resource allocation information may be made using information such as the reliability of the TA information notified by the Message2, a random number, and the like.

In this embodiment, the radio resource allocation information notified by the Message2' is selected using the reception level of the notifying signal (or notifying information) notified to the UE. In other embodiments, the TA notified to the UE may be estimated in advance, in order to select the radio resource allocation information notified by the Message2' that is equal to the estimated TA or is approximately the same as the estimated TA.

The UE uses the selected radio resource allocation information to resend the Message3 (step S1118). In addition, the UE judges whether the Message4 is received from the eNB (step S1120). If the Message4 is received from the eNB (YES in step S1120), the negotiation is completed.

On the other hand, if the Message4 from the eNB is not received (NO in step S1120), the UE selects the preamble number again (step S1102), in order to restart the negotiation with the eNB.

On the other hand, if the Message2' is not received but the Message2 is received (NO in step S1106), the UE sends the Message3 to the eNB (step S1122). The UE judges whether the Message4 is received as a response with respect to the Message3 that is sent (step S1124), and if the Message4 is received (YES in step S1124), the negotiation is completed.

If the Message4 is not received (NO in step S1124), the UE judges that the Message3 did not reach the eNB due to causes other than a collision with another UE, and decrements the counted value of the retransmission counter N of the Message3 by 1 (step S1126). The UE judges whether N=0 (step S1128). If N>0 (NO in step S1126), the UE resends the Message3 (step S1130), and judges whether the Message4 is received (step S1124). On the other hand, if N=0 (YES in step S1128), the UE selects the preamble number again (step S1102), in order to restart the negotiation with the eNB.

Third Embodiment

The difference between the second embodiment and a third embodiment exists in the operation of the mobile station (UE) and not in the operation of the base station (eNB). In the second embodiment, when the UE sends the connection request (Message3) with respect to the Message2', the UE does not perform the operation of the selecting from the plurality of radio resource allocation information, but sends the Message3 using a predetermined (for example, a first) radio resource allocation information. The UE performs the operation of selecting from the plurality of radio resource allocation information only when the Message4 is not received from the eNB with respect to the Message3. On the other hand, in the third embodiment, when the UE sends the connection request (Message3) with respect to the Message2', the UE performs the operation of selecting from the plurality of radio resource allocation information from the start.

Figure 12:
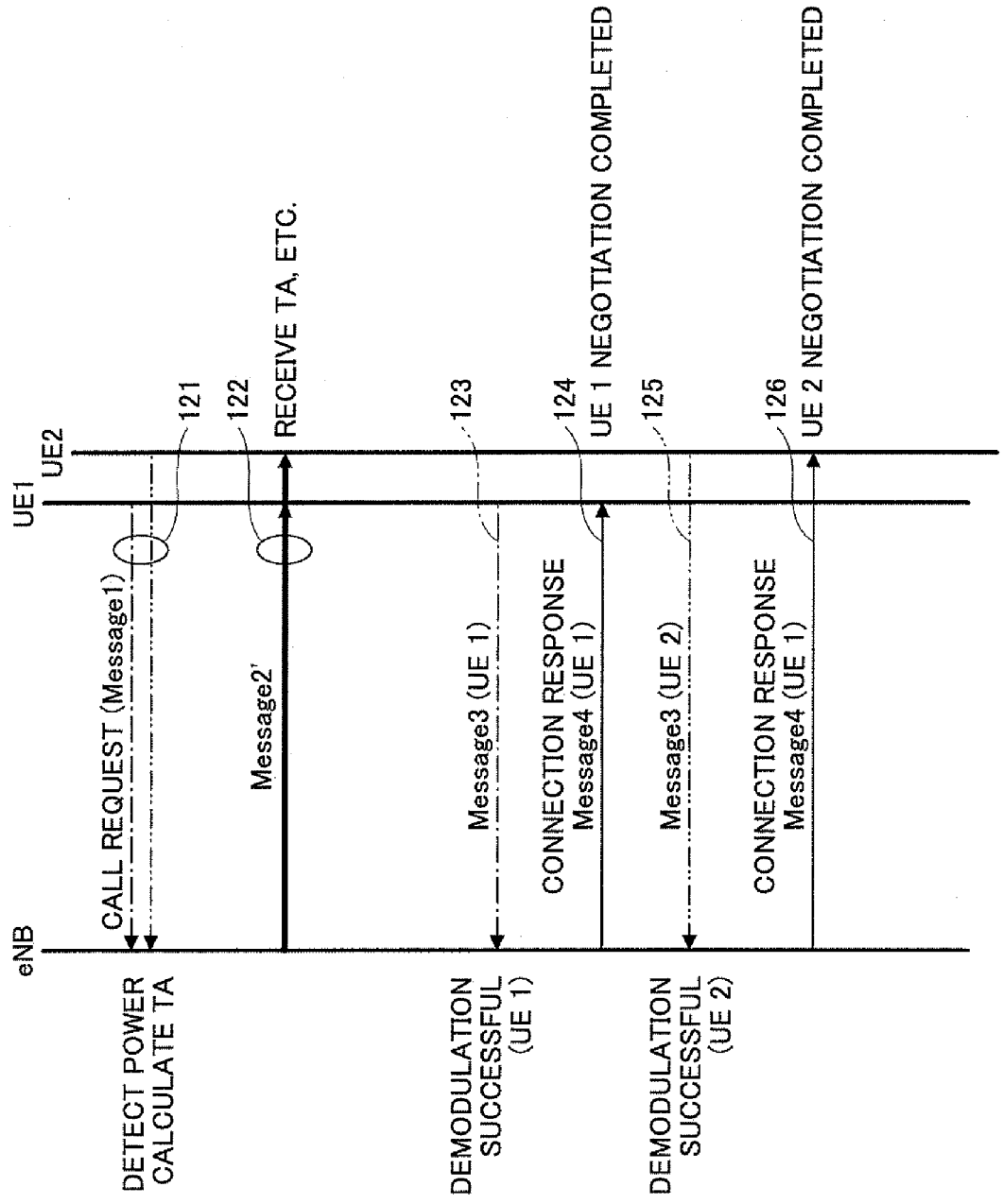
FIG. 12 is a diagram illustrating an example of a link establishment between the base station and the mobile station in a third embodiment of the present invention.

FIG. 12 is a diagram illustrating an example of a link establishment between the base station and the mobile station in the third embodiment of the present invention.

In FIG. 12, a plurality of mobile stations (UEs) send call requests Message1 having the same preamble number (step 121). The eNB detects a collision of the plurality of UEs, based on a result of detecting the powers of the received Message1. For example, if there exist a plurality of paths having the power level greater than or equal to a threshold value, the eNB judges that a plurality of UEs are sending the call requests Message1 having the same preamble number, and notifies a call request response including a plurality of radio resource allocation information, and an uplink communication enable signal, as Message2', to the plurality of UEs at a timing with which a connection request response and an uplink communication enable would be sent as Message2 (step 122).

When the UEs receive the Message2' including the plurality of radio resource allocation information, each of the UEs judges that at least one other UE is using the same preamble number. Hence, each UE sends the Message3 including information unique to the UE, by selecting the plurality of transmission timings notified by the Message2' or, the radio resource allocation information or, both (steps 123 and 125).

The selection of the radio resource allocation information may be made by each UE using information such as (1) a reception level of the notifying signal (SINR), (2) a reliability of the TA information notified by the Message2', (3) a distance from the eNB, and (4) a random number.

As a result, because the UEs resend the Message3 using different radio resources (steps 123 and 125), the eNB is able to demodulate the information unique to the UE, and the eNB may send a connection response Message4 with respect to the UEs (steps 124 and 126).

The negotiation is completed in the above described manner.

Next, a more detailed description will be given of the operations of the eNB and the UE.

Figure 13:
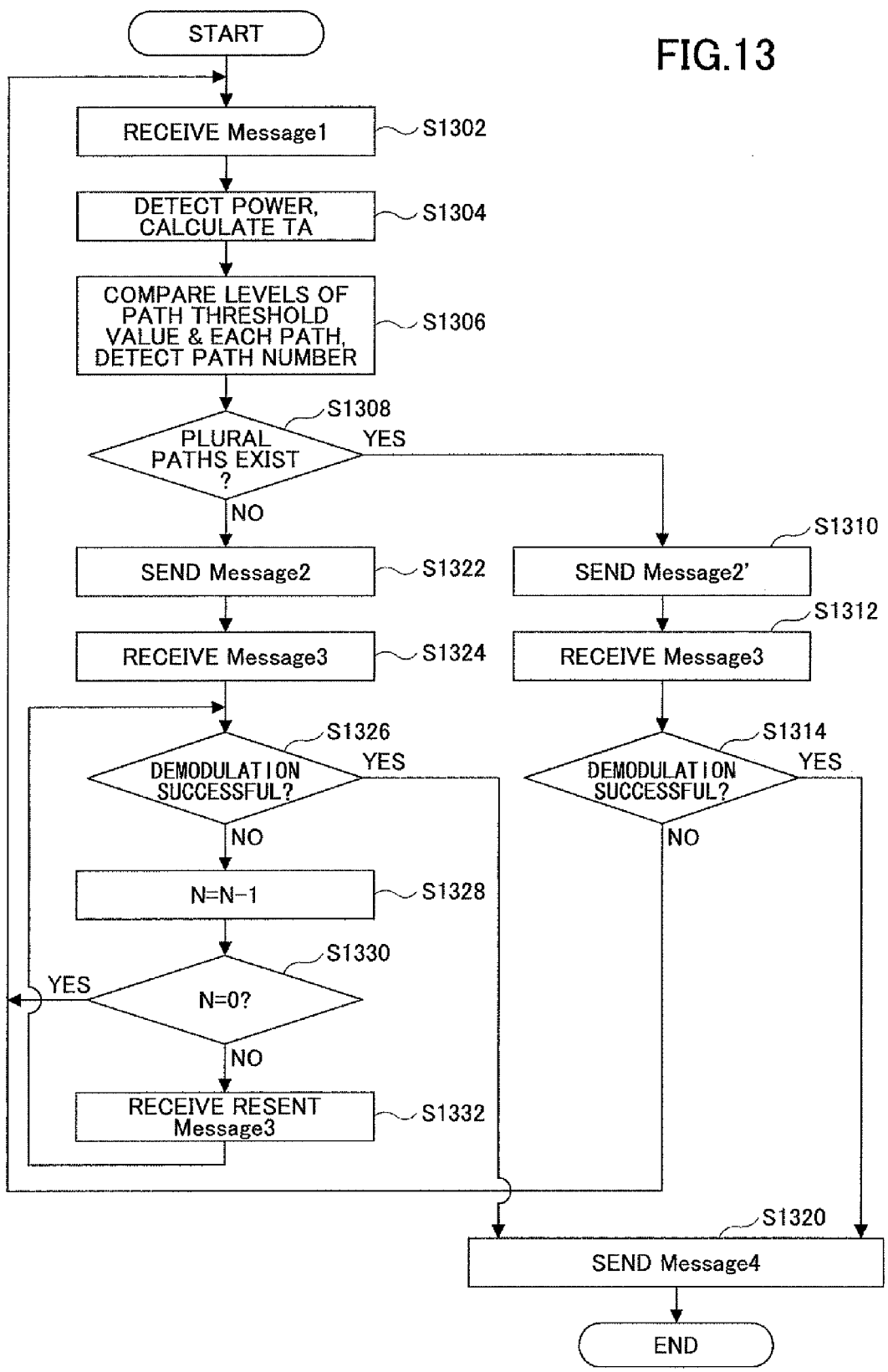
FIG. 13 is a flow chart for explaining an operation of the base station when making the link establishment in the third embodiment.

FIG. 13 is a flow chart for explaining an operation of the base station (eNB) when making the link establishment in the third embodiment. In FIG. 13, steps S1302 through S1314 and steps S1320 through S1332 are the same as the steps S1002 through S1004 and the steps S1020 through S1032 illustrated in FIG. 10, and a description thereof will be omitted.

In FIG. 13, there are no steps corresponding to the steps S1016 and S1018 illustrated in FIG. 10. This is because, when the UE that receives the Message2' sends the Message3, this UE performs the operation of selecting from the plurality of ratio resource allocation information from the start. If the Message3 received from the UE may not be demodulated successfully in the eNB (NO in step S1314), the process returns to the start and waits or assumes a standby state until the Message1 is received from the UE (step S1302).

Figure 14:
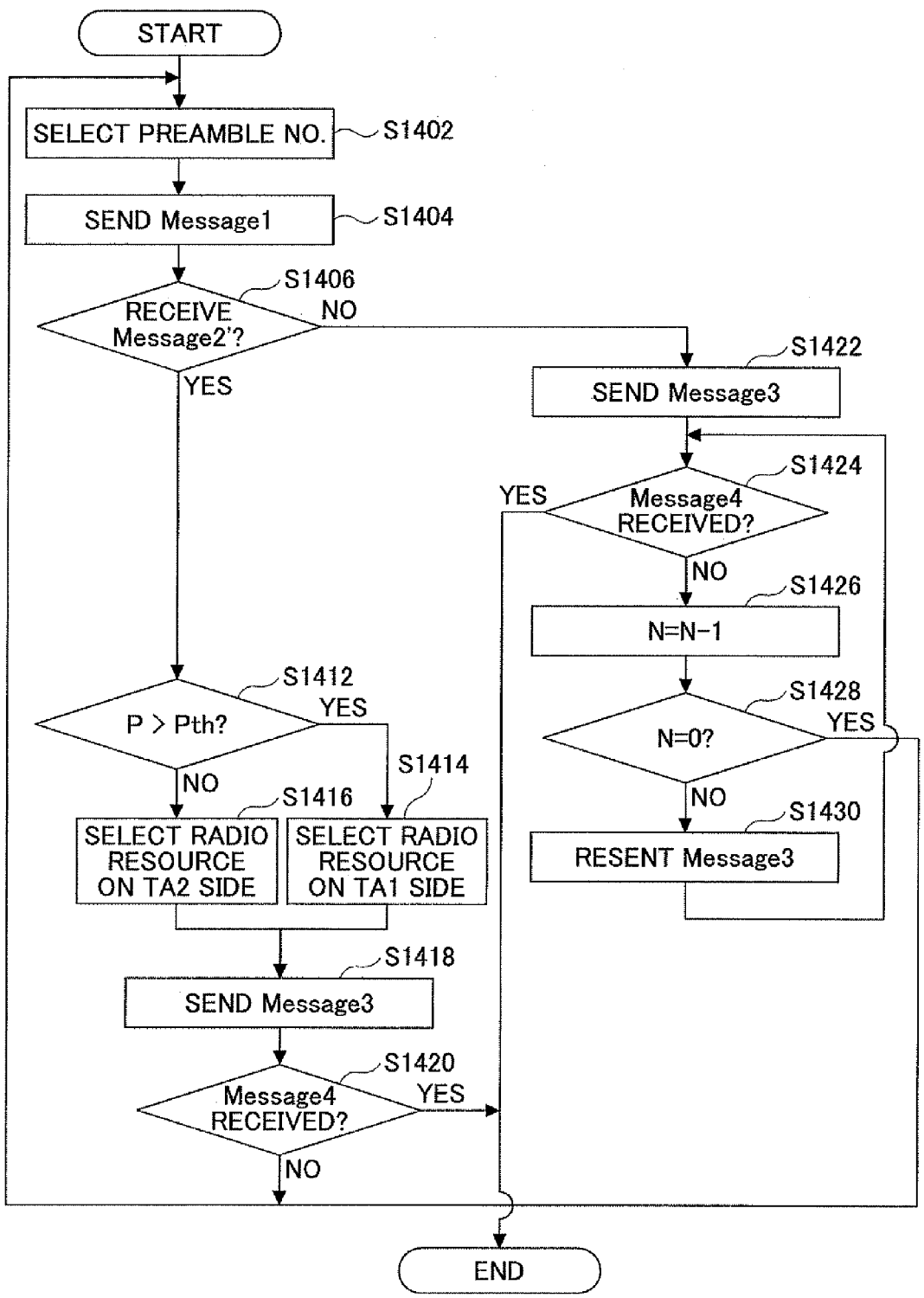
FIG. 14 is a flow chart for explaining an operation of the mobile station when making the link establishment in the third embodiment.

FIG. 14 is a flow chart for explaining an operation of the mobile station (UE) when making the link establishment in the third embodiment. In FIG. 14, steps S1402 through S1406 and steps S1412 through S1430 are the same as the steps S1102 through S1106 and the steps S1112 through S1130 illustrated in FIG. 11, and a description thereof will be omitted.

In FIG. 14, there are no steps corresponding to the steps S1108 and S1110 illustrated in FIG. 11. This is because, when the UE receives the Message2' and sends the Message3, this UE performs the operation of selecting from the plurality of ratio resource allocation information from the start. If the call request response including the plurality of radio resource allocation information, and the uplink communication enable signal, are received from the eNB as the Message2' (YES in step S1406), the UE immediately compares the reception level P (or an average value of P) of the notifying signal and the threshold value Pth of the notifying signal reception level (step S1412), and the UE selects the radio resource (steps S1414 and S1416).

According to the link establishing method in a random access radio communication system in accordance with the first through third embodiments described above, when the base station (eNB) judges that a collision of the requests from the plurality of mobile stations (UEs) has occurred, depending on the Message1 (call request signal) or the Message3 (first connection request signal), the base station sends the Message2' (notifying signal) that notifies the plurality of radio resource allocation information in one stage, and the mobile station sends the Message3 (second connection request signal) using one radio resource allocation information that is selected from the plurality of radio resource allocation information notified by the Message2' (notifying signal) in another stage.

Effects obtainable by each of the embodiments are listed in the following Table 1. For the sake of convenience, the number of retransmission is 4 times, and the round-trip time is 4 msec for these examples. As may be seen from Table 1, the embodiments may reduce the negotiation time. In addition, because the number of times the Message3 is sent may be reduced, unwanted radio-frequency radiation may be avoided, and unwanted radio interference may be reduced.

TABLE 1

|  | Negotiation Time | Reduction Time | Improvement |
| --- | --- | --- | --- |
| First Embodiment | 20 msec | 36 msec | 64% |
| Second Embodiment | 20 msec | 36 msec | 64% |
| Third Embodiment | 12 msec | 44 msec | 79% |

Figure 15:
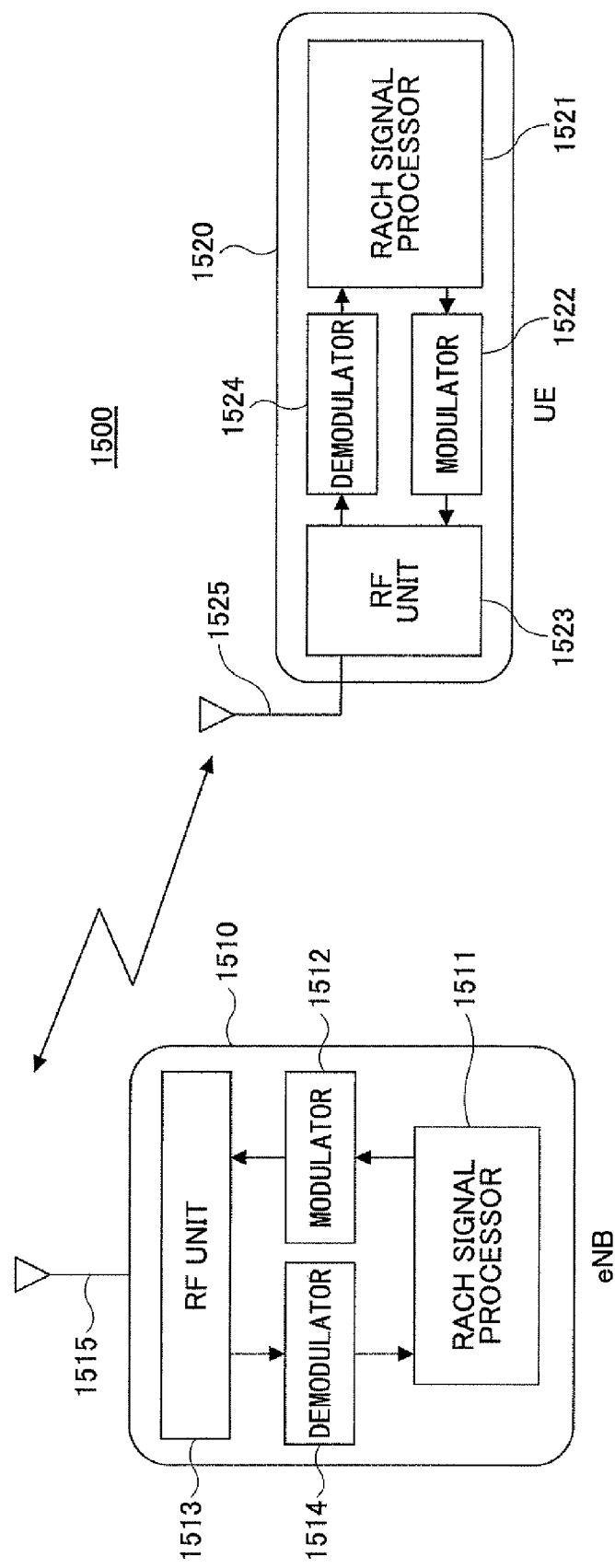
FIG. 15 is a block diagram illustrating an example of a radio communication system in one embodiment of the present invention.

FIG. 15 is a block diagram illustrating an example of a radio communication system in one embodiment of the present invention. A radio communication system 1500 illustrated in FIG. 15 includes a base station (eNB) 1510 and a mobile station (UE) 1520.

The base station 1510 includes a RACH (Random Access CHannel) signal processor 1511 to process signals related to the RACH, a modulator 1512 to modulate a baseband signal into an RF (Radio Frequency) signal, an RF unit 1513 (works as a transmitter and a receiver) to subject the RF signal to a process such as amplification, and a demodulator 1514 to demodulate the RF signal into the baseband signal.

The mobile station 1520 includes a RACH signal processor 1521 to process signals related to the RACH, a modulator 1522 to modulate a baseband signal into an RF signal, an RF unit 1523 (works as a transmitter and a receiver) to subject the RF signal to a process such as amplification, and a demodulator 1524 to demodulate the RF signal into the baseband signal.

The base station 1510 and the mobile station 1520 may communicate with each other via an antenna 1515 of the base station 1510 and an antenna 1525 of the mobile station 1520. In addition, the base station 1510 and the mobile station 1520 may perform an initial access, a handover, and a reconnection using the RACH. The radio communication system 1500 may include base stations (eNBs) and mobile stations (UEs) other than the base station 1510 and the mobile station 1520.

Figure 16:
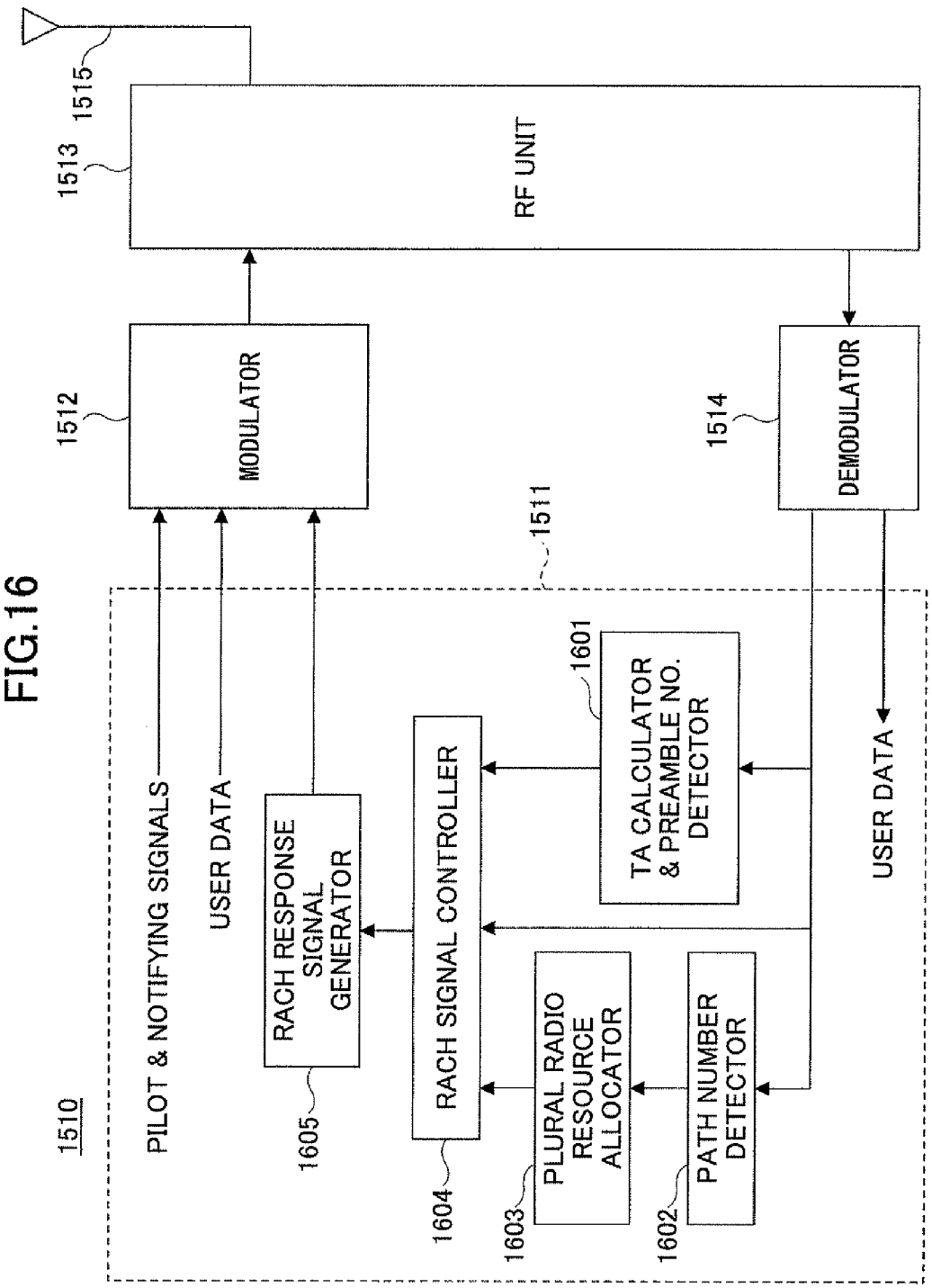
FIG. 16 is a block diagram illustrating an example of the base station illustrated in FIG. 15 in more detail.

FIG. 16 is a block diagram illustrating an example of the base station illustrated in FIG. 15 in more detail.

In the base station 1510 illustrated FIG. 16, the RACH signal processor 1511 includes a TA calculator and preamble number detector 1601, a path number detector 1602, a plural radio resource allocator 1603, a RACH signal controller 1604, and a RACH response signal generator 1605.

The RF unit 1513 receives the signal sent from the mobile station 1520 via the antenna 1515, and outputs the received signal to the demodulator 1514. On the other hand, the signal input to the RF unit 1513 from the modulator 1512 is sent to the mobile station 1520 via the antenna 1515.

The demodulator 1514 demodulates the signal input from the RF unit 1513, and outputs a demodulated user data signal to other constituent elements (not illustrated) of the base station 1510. The demodulated user data signal from the demodulator 1514 is also output to the TA calculator and preamble number detector 1601, the path number detector 1602, and the RACH signal controller 1604.

The modulator 1512 modulates the signal from the RACH response generator 1605, and outputs the modulated signal to the RF unit 1513. In addition, the modulator 1512 also modulates the user data signal, the notifying signal, and a pilot signal from other constituent elements (not illustrated) of the base station 1510, and outputs the modulated signals to the RF unit 1513.

The TA calculator and preamble number detector 1601 detects a difference between the timing of the received signal and the reference timing of the base station 1510 from the signal input from the demodulator 1514, and calculates the TA (Timing Advance). In addition, the TA calculator and preamble number detector 1601 detects the preamble number of the received signal, and outputs the detected preamble number to the RACH signal controller 1604.

The path number detector 1602 detects the number of paths (or path number) having the same preamble number, from the signal input from the demodulator 1514, and outputs the detected path number to the plural radio resource allocator 1603.

The plural radio resource allocator 1603 performs a radio resource allocation based on the signal (detected path number) input from the path number detector 1602, and outputs a result of the radio resource allocation to the RACH signal controller 1604.

The RACH signal controller 1604 performs a control to send the Message2, the Message2', and the Message4, based on the signals input from the demodulator 1514, the TA calculator and preamble number detector 1601, and the plural radio resource allocator 1603.

The RACH response signal generator 1605 generates a RACH response signal based on a control signal from the RACH signal controller 1604, and outputs the RACH response signal to the modulator 1512.

Accordingly, the base station 1510 may perform a random access link establishment with respect to the mobile station 1520. In addition, when the base station 1510 judges that a collision of the requests from a plurality of mobile stations 1520 has occurred depending on the Message1 (call request signal) or the Message3 (first connection request signal) as described above in conjunction with FIGS. 5, 9, and 12, the RACH signal processor 1511 of the base station 1510 sends the Message2' (notifying signal) to notify the plurality of radio resource allocation information.

In addition, the base station 1510 includes the RACH signal controller 1604 to send the Message2' (notifying signal) as a response signal with respect to the Message1 (call request signal) or a response signal with respect to the first connection request signal. Moreover, the base station 1510 includes the path number detector (or collision detector) 1602 to judge whether the collision of the requests from the plurality of mobile stations 1520 has occurred, based on the reception level of the Message1 (call request signal) or the Message3 (first connection request signal). Furthermore, the base station 1510 includes the plural radio resource allocator 1603 to allocate the plurality of radio resource allocation information, including timing information, radio resource allocation enable information, and the user ID information.

Figure 17:
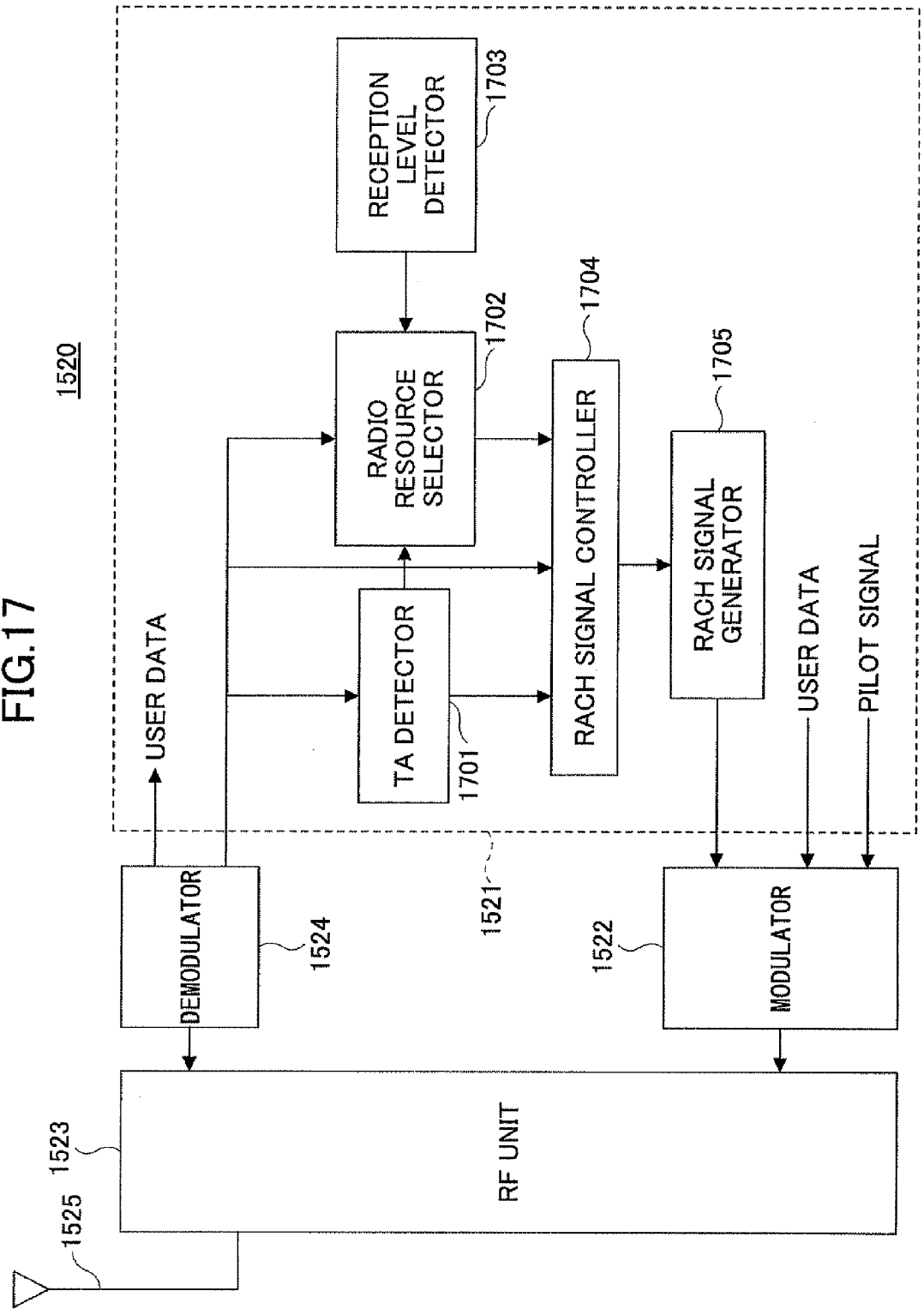
FIG. 17 is a block diagram illustrating an example of the mobile station illustrated in FIG. 15 in more detail.

FIG. 17 is a block diagram illustrating an example of the mobile station illustrated in FIG. 15 in more detail. The mobile station 1520 illustrated in FIG. 17 includes a RACH signal processor 1521, a modulator 1522, an RF unit 1523, and a demodulator 1524.

The RACH signal processor 1521 includes a TA detector 1701, a radio resource selector 1702, a reception level detector 1703, a RACH signal controller 1704, and a RACH signal generator 1705.

The RF unit 1523 receives a signal sent from the base station 1510 via an antenna 1525, and outputs the received signal to the demodulator 1524. In addition, the RF unit 1523 sends a signal input from the modulator 1522 to the base station 1510 via the antenna 1525.

The demodulator 1524 demodulates the signal input from the RF unit 1523, and outputs the demodulated user data signal to other constituent elements (not illustrated) of the mobile station 1520. The demodulated user data signal from the demodulator 1524 is also output to the TA detector 1701, the radio resource selector 1702, and the RACH signal controller 1704.

The modulator 1522 modulates the signal from the RACH signal generator 1705, and outputs the modulated signal to the RF unit 1523. In addition, the modulator 1522 also modulates the user data signal, the notifying signal, and the pilot signal from other constituent elements (not illustrated) of the mobile station 1520, and outputs the modulated signals to the RF unit 1523.

The TA detector 1701 detects the TA information notified by the call response and the uplink communication enable information, that is, the Message2, sent from the base station 1510, and outputs the detected TA information to the RACH signal controller 1704.

The radio resource selector 1702 selects the radio resource allocation information by comparing the reception level and the threshold value, based on the signal from the reception level detector 1703, when the plurality of radio resource allocation information is notified by the Message2' or, when the connection response (Message4) is not notified after the Message2' is notified, and outputs the selected radio resource allocation information to the RACH signal controller 1704.

The reception level detector 1703 measures the reception level of the notifying signal or the pilot signal, and outputs the detected reception level to the radio resource selector 1702.

The RACH signal controller 1704 selects the preamble number to be sent by the call request (Message1) at random, and outputs the selected preamble number to the RACH signal generator 1705. In addition, when the call response and the uplink communication enable information (Message2) is received, the EACH signal controller 1704 determines the transmission timing of the connection request and the radio resource, based on the signals from the TA detector 1701, the plural radio resource selector 1702, and the demodulator 1524, and performs a control to send the information unique to the mobile station 1520 to the base station 1510.

The RACH signal generator 1705 generates the signal (for example, Message1 and Message3) to be sent to the base station 1510, based on a control signal from the RACH signal controller 1704, and outputs the generated signal to the modulator 1522.

Hence, the mobile station 1520 may perform a random access link establishment with respect to the base station 1510. In addition, the mobile station 1510 includes the RACH signal processor 1521 to send the Message3 (second connection request signal) to the base station 1510 using one radio resource selected from the plurality of radio resources notified by the Message2' (notifying information) received from the base station 1510, depending on the Message1 (call request signal) or the Message3 (first connection request signal).

Moreover, the mobile station 1520 includes the radio resource selector 1702 to select one radio resource from the plurality of radio resources notified by the Message2' (notifying signal), based on the reception level of the Message2' (notifying signal), the reliability of the timing information, the distance from the base station 1510, or the random number.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
   a communicating unit configured to make a radio communication with a plurality of mobile stations;
   a detecting unit configured to detect a collision of requests from the plurality of mobile stations received by the communicating unit when a reception level of one of a call request signal and a connection request signal that is received from at least two of the plurality of mobile stations, selecting identical preamble numbers, exceeds a threshold value; and
   a signal processing unit configured to send from the communicating unit to the plurality of mobile stations a notifying signal notifying a plurality of radio resources from which one radio resource is to be selected at one of the plurality of mobile stations when existence of a plurality of paths is judged by the signal processing unit and the collision is detected by the detecting unit,
   wherein the notifying signal includes a preamble number selected by the one of the plurality of mobile stations, and information granting allocation of an uplink radio resource to be used by the one of the plurality of mobile stations.

2. The base station as claimed in claim 1, the signal processing unit sends the notifying signal as a response signal with respect to the one of the call request signal and the connection request signal.

3. The base station as claimed in claim 1, wherein the detecting unit detects the collision of the requests from the plurality of mobile stations, based further on a demodulation result of the connection request signal that is received from the plurality of mobile stations.

4. The base station as claimed in claim 1, further comprising:
   an allocating unit configured to allocate the plurality of radio resources including timing information, radio resource allocation enable information, and user ID information.

5. The base station as claimed in claim 1, wherein the preamble number is in conformance with a Long Term Evolution (LTE).

6. The base station as claimed in claim 5, wherein the information granting allocation of the uplink radio resource to be used by the one of the plurality of mobile stations includes a band used by the one of the plurality of mobile stations, a data number, and a modulation technique.

7. The base station as claimed in claim 1, wherein the signal processing unit detects a number of paths having a power level greater than a path judging threshold value, and judges the plurality of paths when the number of paths detected is greater than one.

8. The base station as claimed in claim 1, further comprising:
   a demodulator configured to demodulate the connection request signal that is received by the communicating unit from the plurality of mobile stations, and judge whether demodulation of the connection request signal is successful;
   wherein the detector detects the collision when the demodulator judges unsuccessful demodulation of the connection request signal.

9. A mobile station comprising:
   a communicating unit configured to make a radio communication with a base station;
   a resource selecting unit configured to select one of a plurality of radio resources notified by a notifying signal that is received by the communicating unit from the base station; and
   a signal processing unit configured to send a second connection request signal from the communicating unit using the one of the plurality of radio resources selected by the resource selecting unit, based on a reception level of the notifying signal, in response to sending one of a call request signal and a first connection request signal to the base station,
   wherein the notifying signal includes a preamble number selected by the mobile station prior to sending the one of the call request signal and the first connection request signal to the base station, and information granting allocation of an uplink radio resource to be used by the mobile station.

10. The mobile station as claimed in claim 9, wherein the resource selecting unit selects the one radio resource from the plurality of radio resources notified by the notifying signal, based further on at least one of a reliability of timing information, a distance from the base station, and a random number.

11. The mobile station as claimed in claim 9, wherein the preamble number is in conformance with a Long Term Evolution (LTE).

12. The mobile station as claimed in claim 11, wherein the information granting allocation of the uplink radio resource to be used by the one of the plurality of mobile stations includes a band used by the one of the plurality of mobile stations, a data number, and a modulation technique.

13. The mobile station as claimed in claim 9, wherein the signal processing unit sends the second connection request signal to the base station by retransmitting the first connection request signal.

14. A link establishing method to be implemented in a radio communication system, comprising:
   sending one of a call request signal and a first connection request signal from a plurality of mobile stations to a base station;
   sending from the base station to the plurality of mobile stations a notifying signal notifying a plurality of radio resources from which one radio resource is to be selected at one of the plurality of mobile stations when the base station judges existence of a plurality of paths and a collision of requests from the plurality of mobile stations, from one of the call request signal and the first connection request signal that is received from the plurality of mobile stations, said collision being detected when a reception level of the request signal that is received from at least two of the plurality of mobile stations, selecting identical preamble numbers, exceeds a threshold value; and sending a second connection request signal from the one of the plurality of mobile stations using the one radio resource, selected from the plurality of radio resources notified by the notifying signal that is received from the base station, based on a reception level of the notifying signal, in response to the sending the one of the call request signal and the first connection request signal to the base station, wherein the notifying signal includes a preamble number selected by the one of the plurality of mobile stations, and information granting allocation of an uplink radio resource to be used by the one of the plurality of mobile stations.

15. The link establishing method as claimed in claim 14, wherein the base station sends the notifying signal as a response signal with respect to the one of the call request signal and the first connection request signal.

16. The link establishing method as claimed in claim 14, wherein the base station judges the collision of the requests from the plurality of mobile stations, based further on a demodulation result of the first connection request signal that is received from the plurality of mobile stations.

17. The link establishing method as claimed in claim 14, wherein the mobile station selects the one radio resource from the plurality of radio resources notified by the notifying signal, based further on at least one of a reliability of timing information, a distance from the base station, and a random number.

18. The link establishing method as claimed in claim 14, wherein the plurality of radio resources include timing information, radio resource allocation enable information, and user ID information.

19. The link establishing method as claimed in claim 14, wherein the preamble number is in conformance with a Long Term Evolution (LTE).

20. The link establishing method as claimed in claim 19, wherein the information granting allocation of the uplink radio resource to be used by the one of the plurality of mobile stations includes a band used by the one of the plurality of mobile stations, a data number, and a modulation technique.

21. The link establishing method as claimed in claim 14, further comprising:

demodulating the connection request signal that is received from the plurality of mobile stations by the base station in order to judge whether demodulation of the connection request signal is successful, wherein the base station judges whether the plurality of paths exist when the demodulation of the connection request signal is judged to be successful.

\* \* \* \* \*